(12) United States Patent
Shenhar et al.

(10) Patent No.: US 11,704,193 B1
(45) Date of Patent: Jul. 18, 2023

(54) MEMORY SCRUB USING MEMORY CONTROLLER

(71) Applicant: Amazon Technologies, Inc., Seattle, WA (US)

(72) Inventors: Talel Shenhar, Haifa (IL); Ronen Krupnik, Haifa (IL); Barak Wasserstrom, Mitzpe Aviv (IL)

(73) Assignee: Amazon Technologies, Inc., Seattle, WA (US)

( * ) Notice: Subject to any disclaimer, the term of this patent is extended or adjusted under 35 U.S.C. 154(b) by 92 days.

(21) Appl. No.: 17/325,953

(22) Filed: May 20, 2021

(51) Int. Cl.
*G11C 29/00* (2006.01)
*G06F 11/10* (2006.01)
*G06F 15/78* (2006.01)
*G06F 11/30* (2006.01)
*G06F 15/173* (2006.01)
*G06F 11/07* (2006.01)

(52) U.S. Cl.
CPC ...... *G06F 11/1068* (2013.01); *G06F 11/0772* (2013.01); *G06F 11/106* (2013.01); *G06F 11/3037* (2013.01); *G06F 15/173* (2013.01); *G06F 15/7807* (2013.01)

(58) Field of Classification Search
CPC ............... G06F 11/1968; G06F 11/106; G06F 11/3027; G06F 11/0772; G06F 15/7807; G06F 15/173
See application file for complete search history.

(56) References Cited

U.S. PATENT DOCUMENTS

| | | | |
|---|---|---|---|
| 2005/0060603 A1* | 3/2005 | Pomaranski | G06F 11/106 714/6.32 |
| 2013/0007507 A1* | 1/2013 | Raj | G06F 11/0793 714/5.11 |
| 2013/0254433 A1* | 9/2013 | Lu | G06F 13/28 710/22 |
| 2015/0067437 A1* | 3/2015 | Bains | G06F 11/1048 714/758 |

* cited by examiner

*Primary Examiner* — Samir W Rizk
(74) *Attorney, Agent, or Firm* — Weaver Austin Villeneuve & Sampson LLP (57) ABSTRACT

A system-on-chip (SoC) can include a processor, a network controller configured to provide a network interface, and a memory controller configured to perform memory scrubbing. A memory patrol driver executing on the processor can initiate direct memory access (DMA) transfers to read successive portions of the memory by configuring corresponding DMA descriptors at a certain time interval. The network controller can perform each DMA transfer to read a corresponding portion of the memory, which can cause the memory controller to scrub the corresponding portion of the memory. The scrubbed data is sent to the network controller, which is discarded by the network controller.

20 Claims, 6 Drawing Sheets

MEMORY SCRUB USING MEMORY CONTROLLER

BACKGROUND

Computer memory chips can be prone to transient faults due to environmental factors, which can cause bit-flips in the memory cells. Generally, error-correcting codes (ECC) can be implemented to recover from single-bit errors. Memory scrubbing can be used to read a memory location and if a bit-error is detected, ECC can be used to correct the bit-error, and the corrected data can be written back to the same memory location. However, large size and compact design of memory chips for modern day applications can increase the vulnerability of memory cells to these transient faults over time resulting in higher numbers of single-bit errors or in some cases, multi-bit errors, which can be catastrophic for certain applications.

BRIEF DESCRIPTION OF THE DRAWINGS

Various embodiments in accordance with the present disclosure will be described with reference to the drawings, in which.

DETAILED DESCRIPTION

Certain semiconductor memories comprise memory cells that store their programmed values in the form of an electrical charge, which makes them vulnerable to corruption of data. For example, these memory cells can be prone to transient faults (or soft errors) arising from cosmic rays, alpha particle emissions, or magnetic interference. Sometime these transient faults can introduce a logical fault in the operation of the memory cell, which can change the state of the memory cell (e.g., a bit-flip) or interfere with the circuitry used to write or read the memory cell. These transient faults are generally prevalent in volatile memories including dynamic random access memories (DRAMs) or static random access memories (SRAMs) with high integration density, and can increase over time as the memory chips get older.

Error-correcting codes (ECC) can be used to detect and correct single-bit errors in the memory chips by storing extra bits in the memory for the ECC. For example, an 8-bits ECC can be stored for each 64-bits memory word. Certain systems can include a memory controller capable of performing memory scrubbing using the ECC bits. The memory controller can perform the memory scrubbing by identifying a bit-error using an ECC checksum on the memory data read from a memory location. The memory controller can correct the erroneous bit and write the corrected bit back to the same memory location. The memory controller can perform memory scrubbing by periodically patrolling the memory to fix errors, or on demand.

In certain cases, single-bit errors, if not corrected, can result in multi bit-errors (e.g., if a data bit of the memory region protected by the ECC checksum gets corrupted). The multi-bit errors can be detected by the memory controller; however, the multi-bits errors are generally un-correctable. In such cases, a message or an interrupt can be sent to a host processor indicating that an un-correctable error has been detected, so that appropriate actions can be taken (e.g., reset or reboot, designate the memory location unusable, etc.). In some cases, the system may crash or may not recover from the multi-bit errors, which can be catastrophic for certain applications (e.g., loss of information, interruption in service, etc.).

Certain memory regions can be reserved, protected, unused, or not accessible based on the system specification. For example, a memory region may be configured as reserved by an operating system for security purposes, future use, or other reasons. This memory region may be more vulnerable to soft errors since it may not be accessed by the memory controller for scrubbing. Over time, these soft errors can accumulate to multi-bit errors. Thus, it is desirable to avoid multi-bit errors to occur in the first place so that the memory data can be protected.

Certain embodiments can provide systems and methods to enable memory patrolling (e.g., at a regular interval) so that the memory can be scrubbed in a continuous matter to avoid the occurrence of multi-bit errors by keeping it free of single-bit errors. In certain embodiments, a memory controller can be utilized to scrub a portion of the memory successively at a certain time interval so that the entire memory can be scrubbed in a continuous manner. As an example, a successive portion of the memory (e.g., 1 KB) can be scrubbed every millisecond (msec) in a continuous manner, and the single-bit errors can be detected and corrected during this process. If a multi-bit error is identified, it can be reported using the normal communication protocols.

In certain embodiments, a network controller device, which is capable to perform direct memory access (DMA) transfers with the memory can support memory patrol operations by using the memory controller to scrub the memory. The network controller device can be part of a system-on-chip (SoC) comprising a processor. The memory can be internal or external to the SoC. The memory can include any type of memory, which can be corrected for bit-flips, including DRAMs, SRAMs, SDRAMs, or DDR SDRAMs. The SoC may also include a memory controller that is capable to perform memory scrubbing for every read operation of the memory.

A memory patrol driver executing on the processor can initiate successive DMA transfers by configuring corresponding DMA descriptors at a certain time interval. The DMA transfers can be performed by the network controller device to read successive portions of the memory at each time interval. A DMA controller in the network controller device can perform each read operation to read a corresponding portion of the memory, as if that portion of the memory is storing data for network packets. Performing each read operation can cause the memory controller to read the corresponding portion of the memory at a specified location and detect whether any single-bit error exists on the data. If any single-bit errors are detected, the memory controller can correct the errors using the corresponding ECC bits and write the corrected bits back to the same memory location. The scrubbed data can be sent to the network controller device using a memory interface. The network controller device can discard this scrubbed data instead of transmitting it as the network packets.

The memory patrol driver can configure a respective DMA descriptor after each time interval to initiate the successive DMA transfers. The network controller can continue reading each portion of the memory successively by performing a corresponding DMA transfer based on the respective DMA descriptor, which can cause the memory controller to scrub the entire memory one portion at a time, and start again from the beginning, etc. This process can continue in the background at a slower speed so that the normal operation of the SoC is not impacted. Thus, enabling the memory controller to perform the memory scrubbing operation at a certain interval in a continuous manner can allow correcting the single-bit errors in a timely manner before they get accumulated as multi-bit errors.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiments being described.

Figure 1:
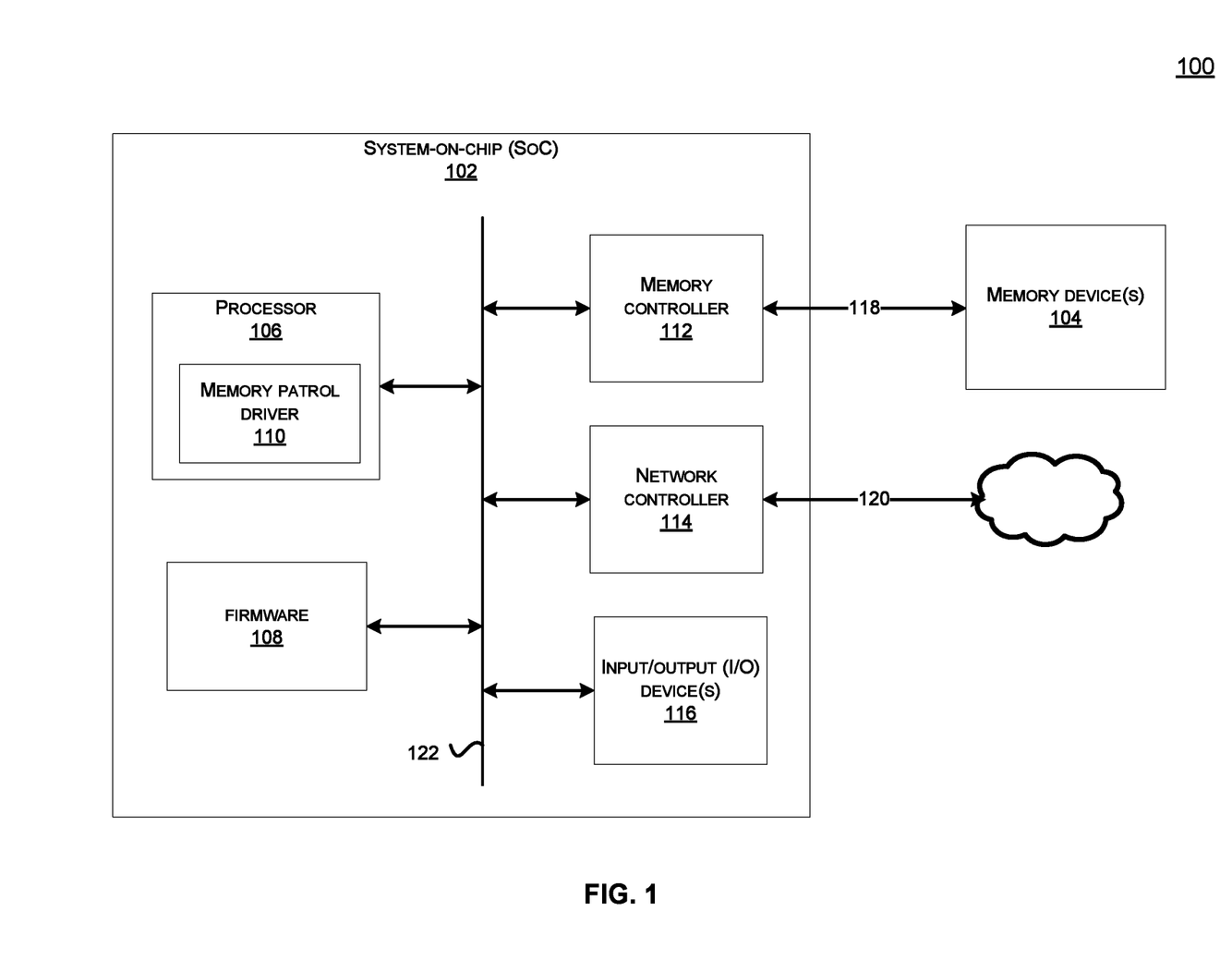
FIG. 1 illustrates a computer system, which can be used to perform memory scrubbing of a memory device according to certain embodiments.

FIG. 1 illustrates a computer system 100, which can be used to perform memory scrubbing of a memory device according to certain embodiments. The computer system 100 can be part of a server, which can be used for cloud computing, web hosting, cloud hosting, or networking, among other applications.

The computer system 100 may include a system-on-chip (SoC) 102 coupled to one or more memory devices 104. The computer system 102 may include a processor 106, a memory controller 112, a network controller 114, and one or more input/output (I/O) devices 116 configured to communicate with one another via an internal bus 122. Note that the SoC 102 may include other or different components based on the specification of the computer system 100, which are not shown here for ease of simplification. Certain embodiments can support the memory devices 104 as part of the SoC 102 without deviating from the scope of the disclosure.

The processor 106 may include one or more processing cores that may be configured to execute instructions stored in a computer-readable medium. For example, the instructions may be in the form of program code stored as firmware 108, which can be executed by the processor 106. In some implementations, the processor 106 may execute a memory patrol driver 110, which can be used to configure memory patrol operations for scrubbing the memory devices 104, according to certain embodiments. The firmware 108 can be part of an on-chip memory (not shown) or an independent memory (e.g., flash). In certain implementations, the firmware 108 can be part of the BIOS firmware. Configuring the memory patrol operations may include configuring the DMA descriptors at a time interval to initiate successive DMA transfers for the network controller 114 to perform the successive DMA transfers, which can cause the memory controller 112 to perform the memory scrubbing, one portion at a time.

The memory devices 104 may include any type of memory including dynamic random access memory (DRAM), static random access memory (SRAM), synchronous dynamic random access memory (SDRAM), or double data rate synchronous dynamic random access memory (DDR SDRAM) that are prone to single-bit or multi-bit errors. In certain embodiments, the memory devices 104 may include dual in-line memory modules (DIMMs) comprising non-ECC memory chips and ECC memory chips based on the configuration of the computer system 100. In certain embodiments, the ECC bits can be stored in-line. For example, for every region of the memory, a set of ECC bits for that region can be stored in the same memory module. When data is written to a location in a region, the ECC bits can be updated in the memory to correspond to the new data at that location.

The network controller 114 may be configured to provide a network interface 120 for communication with remote devices (e.g., client computers). The network interface 120 can provide a physical layer (PHY) interface based on any suitable physical layer protocol, e.g., Ethernet. The network controller 114 may include capability to transfer network packets to and from the memory devices 104 using a direct memory access (DMA) controller. For example, the network controller 114 can buffer ingress networks packets received from a remote device through a media access control (MAC) unit. The received network packets can be transferred to the memory device 104 using a DMA transfer. Similarly, the network controller 114 can perform a DMA transfer to transfer egress network packets stored in the memory device 104 into a transmit buffer, which can be transmitted to the remote device using the MAC unit. The DMA transfers can be setup by a driver or an application executing on the processor 106.

The I/O devices 116 may include one or more I/O devices or peripheral devices. In certain examples, the I/O device 166 may include a peripheral component interconnect express (PCIe) device, e.g., a cryptographic controller or a security module, based on the implementation of the SoC 102. The internal bus 122 may include an advanced peripheral bus (APB), Advanced Microcontroller Bus Architecture (AMBA) Advanced High-performance Bus (AHB), AMBA Advanced eXtensible Interface (AXI) bus, or a proprietary internal bus.

The memory controller 112 may be configured to manage accesses to the memory devices 104 including read or write operations using a memory bus 118. The memory bus 118 may be able to support different data widths based on a single channel access, double-channel access, etc., with ECC protection. As an example, in a single channel mode, the memory bus 118 may be able to support 64-bits of memory data width and in a double channel mode, the memory bus may be able to support 128-bits of memory data width. In certain implementations, the memory bus 118 may be able to support wider data width to include ECC bits along with the memory data. Note that the embodiments can support different sizes, types, and protocols for the memory bus 118, memory devices 104, or the memory controller 112 for different applications without deviating from the scope of the disclosure.

The memory devices 104 can be used to store data associated with various applications executing on the computer system 100, which may include network packets received from the remote devices (e.g., customer data). Each memory device 104 may comprise semiconductor memory cells, which generally retain their programmed values in the form of an electrical charge. However, as discussed previously, the memory cells can be prone to transient faults caused by environmental factors, which can flip the logical state of the memory cell (e.g., from 1 to 0, or from 0 to 1). ECC bits can be used to protect the data stored in the memory devices 104 from corruption due to these transient faults. ECC bits corresponding to each memory word can be stored, which can be used to detect and correct any bit-flips. This is further explained with reference to FIG. 2.

Figure 2:
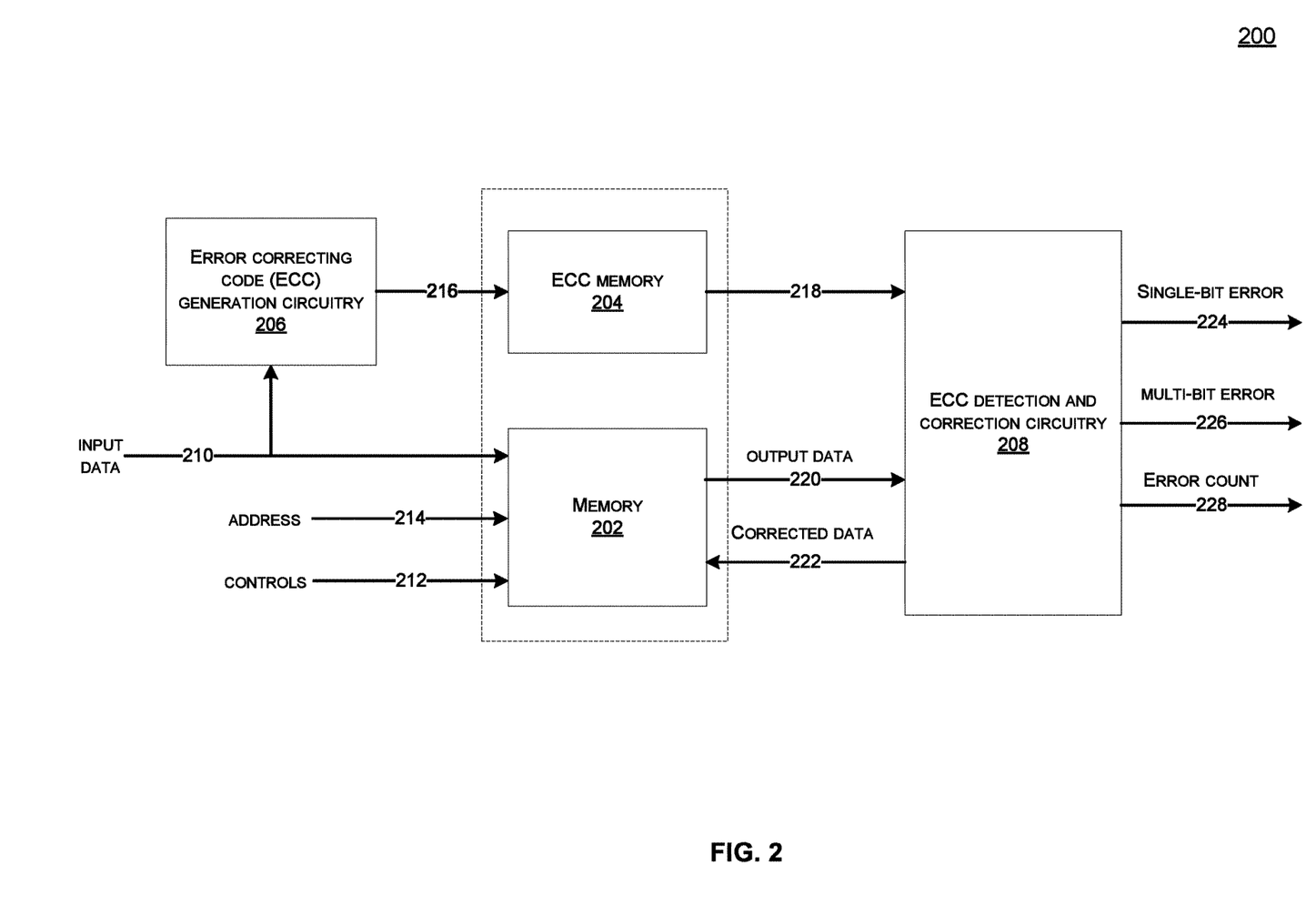
FIG. 2 shows an apparatus for error-correcting codes (ECC) detection and correction, which can be used to describe certain embodiments.

FIG. 2 shows an apparatus 200 for ECC detection and correction, which can be used to describe certain embodiments.

Memory 202 can be an example of the memory devices 104 in FIG. 1. Generally, input data 210 can be written to a location in the memory 202 based on an address 214 and controls 212. For example, the controls 212 can provide write enable, read enable, output enable, or other relevant control signals to access the memory 202. In certain implementations, for each write transaction to the memory 202, the input data 210 for the write transaction can be sent to the memory 202 as well as to an ECC generation circuitry 206. The ECC generation circuitry 206 may be configured to generate ECC bits 216 corresponding to the input data 210 for each write transaction. As an example, for each 64-bits of input data 210, 8-bits of ECC bits 216 can be generated using Hamming codes or another suitable algorithm. The ECC bits 216 can be stored in an ECC memory 204 at a location that can be derived from the address 214 for a given write transaction. In certain implementations, the ECC memory 204 and the memory 202 can be part of the same memory. For example, a portion of the memory 202 can be reserved for storing the ECC bits 216. In certain implementations, the ECC memory 204 may use a separate memory module than the memory modules used by the memory 202.

For every read transaction from a location in the memory 202, based on the controls 212 and the address 214, the memory 202 can provide output data 220, which can be evaluated by an ECC detection and correction circuitry 208 for any errors. For example, the ECC detection and correction circuitry 208 can generate ECC bits for the output data 220 read from the memory 202 using the same algorithm as used by the ECC generation circuitry 206, and compare with corresponding ECC bits 218 stored in the ECC memory 204 for the given address 214. For example, the ECC bits 218 can be retrieved from a location in the ECC memory 204, which can be derived from the address 214. Based on the comparison, the ECC detection and correction circuitry 208 may determine if a single-bit error 224 (e.g., a bit-flip), or a multi-bit error 226 (e.g., multiple bit-flips) exists for the given address.

For example, the single-bit error 224 may be asserted when one of the bits stored in the memory 202 at the give location has flipped (e.g., from a value of 0 to 1, or from a value of 1 to 0). Thus, the ECC bits generated on the corrupt output data 220 may not match with the ECC bits 218 corresponding to the original un-corrupt data stored in the ECC memory 204. The ECC detection and correction circuitry 208 may be capable to correct the flipped bit in the output data 220 and write corrected data 222 back to the same location in the memory 202. In some implementations, the ECC detection and correction circuitry 208 may keep a count of the single-bit errors detected and/or corrected by the ECC detection and correction circuitry 208 using a counter 228. In certain examples, the multi-bit error 226 may be asserted when more than one-bit errors are detected on the output data 220 for a certain location. The multi-bit error 226 can be un-correctable in most cases.

Referring back to FIG. 1, in certain implementations, the ECC generation circuitry 206 and the ECC detection and correction circuitry 208 can be part of the memory devices 104. For example, as the memory write and read transactions are performed, the single-bit errors 224 can be detected and corrected by the memory devices 104. The multi-bit error 226 can be sent to the processor 106 as an interrupt so that appropriate actions can be taken. In certain examples, the error count 228 can be sent to the processor 106 for statistical calculations to keep track of the single-bit errors over time.

In certain implementations, the ECC generation circuitry 206 and the ECC detection and correction circuitry 208 can be part of the memory controller 112. The memory controller 112 may calculate the ECC bits 216 corresponding to the input data 210 for every write transaction and write the ECC bits 216 along with the input data 210 into the memory device 114 using the memory interface 118. For example, the memory interface 118 may support the combined data width for the ECC bits 216 and the input data 210 to be written into the memory devices 104. As discussed previously, the ECC bits 216 can be written into a separate memory module of the memory device 104 designated as the ECC memory 204 or in a separate region of a memory module of the memory device 104.

The memory controller 112 can perform memory scrubbing by detecting if there is any single-bit or multi-bit error for every read operation performed by the memory controller 112. The memory scrubbing may include reading a memory location for the read operation, detecting whether any single-bit or multi-bit error exists on the data read from the memory based on the ECC bits as discussed with reference to FIG. 2, correcting the single-bit error, and writing the corrected data back to that memory location. The memory scrubbing can be performed for every read operation, or can be automated to scrub the memory at a certain times, e.g., when the memory 202 is otherwise idle.

In some cases, a portion of the memory 202 may be unused, reserved, or not accessible under normal usage, and therefore read operations, if any, may seldomly be performed on this reserved portion. For example, an operating system executing on the processor 106 may designate a portion of the memory as reserved or un-accessible to the applications executing on the processor 106. This can cause the reserved portion of the memory 202 to become stale and be vulnerable to bit-flips, which can accumulate over time into multi-bit errors. Some multi-bit errors can be uncorrectable and result in system crash.

In certain embodiments, the memory controller 112 can be enabled to scrub the whole memory 202 in a continuous manner so that the single bit-errors can be corrected frequently before they accumulate into multi-bit uncorrectable errors. The memory 202 can be scrubbed at a certain time interval one portion at a time to cover the whole memory, and this process can be repeated in a continuous manner to keep the memory 202 free of single-bit errors. The memory controller 112 can be enabled by the network controller 114 to scrub the whole memory 202 by causing the memory controller 112 to perform a read operation of the memory 202 by performing a DMA transfer to read a portion of the memory 202 successively at a certain time interval.

In certain embodiments, the memory patrol driver 110 can setup a corresponding DMA descriptor every time interval to initiate the DMA transfers to be performed by the network controller 114 to read successive portions of the memory 202. Each DMA descriptor can include information associated with the DMA transfer including a source address (e.g., a memory address), a destination address (e.g., a buffer in the network controller 114), a transfer size (e.g., a patrol size), a transfer direction (e.g., a memory read), and any other relevant information. The transfer size may indicate a size of the memory to be scrubbed, which can be the same or different for the successive DMA transfers. For example, the memory patrol driver 110 can setup a DMA descriptor every 1 msec to initiate a DMA transfer to read a 1 KB of the memory 202, successively, stating from a first memory address. In certain examples, the time interval between successive DMA transfers related to memory patrolling operations may vary based on scheduling of other applications executing on the SoC 102. In certain examples, the other applications may cause the network controller 114 to perform regular DMA transfers that are not related to memory patrolling operations.

In certain embodiments, the network controller 114 can cause the memory controller 112 to scrub a successive portion of the memory 202 by performing each DMA transfer to read the corresponding portion of the memory 202 as if that portion of the memory 202 is storing data for the egress network packets to be transmitted over the network interface 120. For example, the network controller 114 can perform a DMA read operation to transfer the data stored in the memory device 104 corresponding to the portion being scrubbed into a transmit buffer based on a DMA descriptor. The memory controller 112 can scrub the portion of the memory 202 when performing the read operation and send the scrubbed data to the network controller 114. The network controller 114 can discard this scrubbed data instead of transmitting the network packets over the network interface 120. The network controller 114 can initiate another DMA transfer based on the next DMA descriptor to read the next portion of the memory, which can cause the memory controller 112 to scrub the next portion of the memory. Thus, the network controller 114 can continue performing DMA transfers to read successive portions of the memory 202 at a certain time interval until the whole memory region including the unused or reserved region has been read and scrubbed. Once the whole memory has been scrubbed, the process can start again and continue until a multi-bit error is detected.

The time interval for each DMA transfer to cause memory scrubbing, and the size of the portion to be scrubbed can be determined based on the specification of the memory device 104. In certain examples, the time interval and the size of the portion can be recommended by each vendor of the memory device 104. The time interval and the size of the portion can be changed over time based on the usage of the memory device 104. For example, the newer memory devices may not be scrubbed as frequently as the older memory devices.

Figure 3:
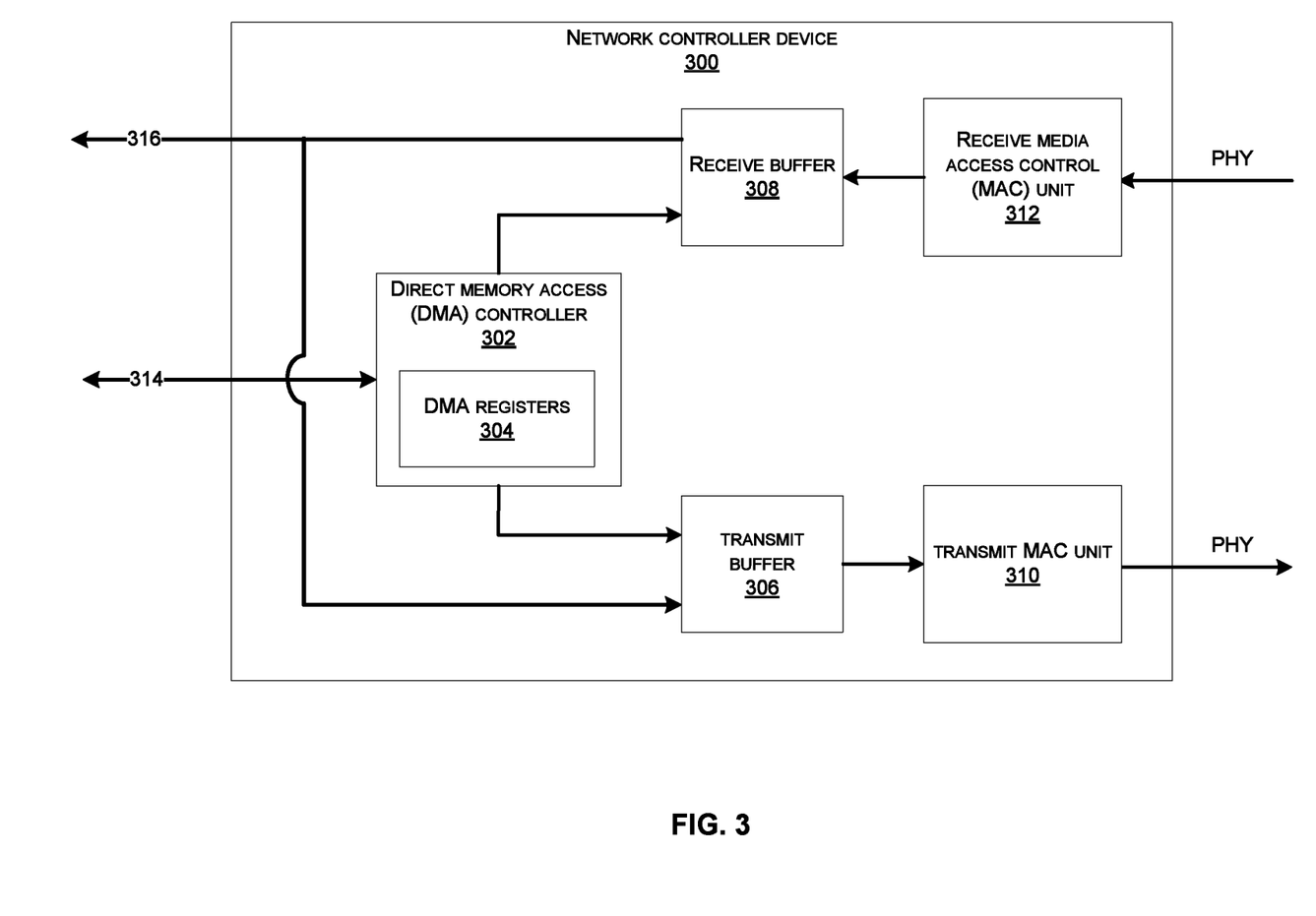
FIG. 3 illustrates a network controller device, which can be configured to use a memory controller to perform memory scrubbing, according to certain embodiments.

FIG. 3 illustrates a network controller device 300, which can be configured to use a memory controller to perform memory scrubbing, according to certain embodiments. The network controller device 300 can be an example of the network controller 114 in FIG. 1. In certain embodiments, functionality or components of the network controller device 300 associated with memory patrolling operations can be part of another component in the SoC 102.

The example network controller device 300 may include a DMA controller 302, a receiver buffer 308, a transmit buffer 306, a receive MAC unit 312, and a transmit MAC unit 310. The network controller device 300 may include other components to provide the functionality for communication with the remote devices, which are not shown here for ease of illustration.

The DMA controller 302 can be used to perform the DMA transfers as configured by the processor 106 via a processor interface 314. For example, the processor interface 314 can be used to configure one or more DMA registers 304 in the DMA controller 302, which may be mapped to an address space of the processor 106. The processor interface 314 may be part of the internal bus 122. The registers may include one or more configuration registers which can be used to enable a DMA transfer, indicate completion of the DMA transfer by enabling an interrupt or a bit, or indicate if a DMA transfer error has occurred. In some implementations, the DMA registers 304 may also include a DMA descriptor register which may include a pointer to a memory address where the DMA descriptors may be stored. For example, the DMA descriptors may be stored in the memory device 104 or another memory in the SoC 102. In some implementations, the DMA descriptors may be stored in the DMA registers 304. Each DMA descriptor can include information associated with a DMA transfer including a source address, a destination address, a transfer size, a transfer direction, and any other relevant information.

The DMA controller 302 may be configured to transfer data to and from the memory devices 104 via a memory interface 316 based on the DMA descriptors. For example, the DMA controller 302 may transfer data from the memory device 104 to the transmit buffer 306 via the memory interface 316, which can be transmitted to the remote device using the transmit MAC unit 310. Similarly, the DMA controller 302 may transfer data received from the remote device via the receive MAC unit 312 and stored in the receive buffer 308 to the memory device 104 via the memory interface 316. The memory interface 316 can be part of the internal bus 122 shown in FIG. 1 or can be a separate interface to the memory controller 112.

The receive MAC unit 312 may be configured to communicate with a physical layer (PHY) (e.g., Ethernet) to receive incoming or ingress network packets from a remote device. The receive MAC unit 312 can process the incoming packets before storing them in the receiver buffer 308. For example, the network packets may include a payload, and a header with frame information associated with the transmission medium. The receive MAC unit 312 can remove the frame information and check for reception errors before storing them in the receiver buffer 308.

The transmit MAC unit 310 may be configured to communicate with the PHY to transmit the egress network packets stored in the transmit buffer 306 to a remote device. The network packets stored in the transmit buffer 306 may be read from the memory device 104 using the memory interface 316. The transmit MAC unit 310 can process the network packets stored in the transmit buffer 306 before transmitting to the remote device. For example, the transmit MAC unit 310 can add frame information associated with the transmission of the packets to the network packets before transmitting them on the PHY.

The receive buffer 308 and the transmit buffer 306 can provide temporary memory storage for storing the network packets before transferring to the memory device 104 or the remote device. The receive buffer 308 and the transmit buffer 306 can be implemented using any suitable data structure including FIFOs, queues, or registers.

In certain embodiments, the memory patrol driver 110 executing on the processor 106 can initiate successive DMA transfers via the processor interface 314 to perform memory patrolling. For example, the memory patrol driver 110 can configure the DMA registers 304 (e.g., enable the DMA operation and setup the DMA descriptors) using the processor interface 314 to initiate a DMA transfer every time interval. In certain examples, the successive DMA transfers may be performed at different time intervals based on scheduling of other applications executing on the SoC 102. The DMA controller 302 may perform each DMA transfer to read a corresponding portion of the memory 202 via the memory interface 316 based on the DMA descriptors. Each portion of the memory 202 read by the DMA controller 302 may correspond to the patrol size configured by the memory patrol driver 110 in the corresponding DMA descriptor as the DMA transfer size.

In certain embodiments, the DMA registers 304 may also be used to enable the memory patrol operation for each DMA transfer to be performed to cause memory scrubbing, which can cause the network controller device 300 to discard the scrubbed data. For example, the configuration register may also include a memory patrol enable bit which can be asserted by the memory patrol driver 110 for each DMA transfer associated with the memory patrol operation, and checked by the transmit MAC unit 310 to discard the scrubbed data read from the memory 202 instead of transmitting it on the network interface 120 as the network packets. In certain implementations, instead of sending the scrubbed data to the transmit MAC unit 310, the scrubbed data can be looped back from the transmit buffer 306 to the receive buffer 308 as the ingress network packets. The receive buffer 308 can discard this scrubbed data based on the memory patrol enable bit. Note that the DMA controller 302 can also be used to perform regular DMA transfers (e.g., not related to memory patrolling) in-between performing the DMA transfers for memory patrolling operations.

The read operation for each DMA transfer related to memory patrolling may cause the memory controller 112 to scrub the corresponding portion of the memory 104 based on the patrol size for the given DMA transfer. For example, the memory controller 112 can read each location of the memory 202 corresponding to the portion and determine whether a single-bit or multi-bit ECC error exists on the data read from the portion of the memory 202. If a single-bit error is identified, the memory controller 112 can correct the single-bit error on the data, and write the corrected data to the memory 202 at that address. This is further explained with reference to FIG. 4.

Figure 4:
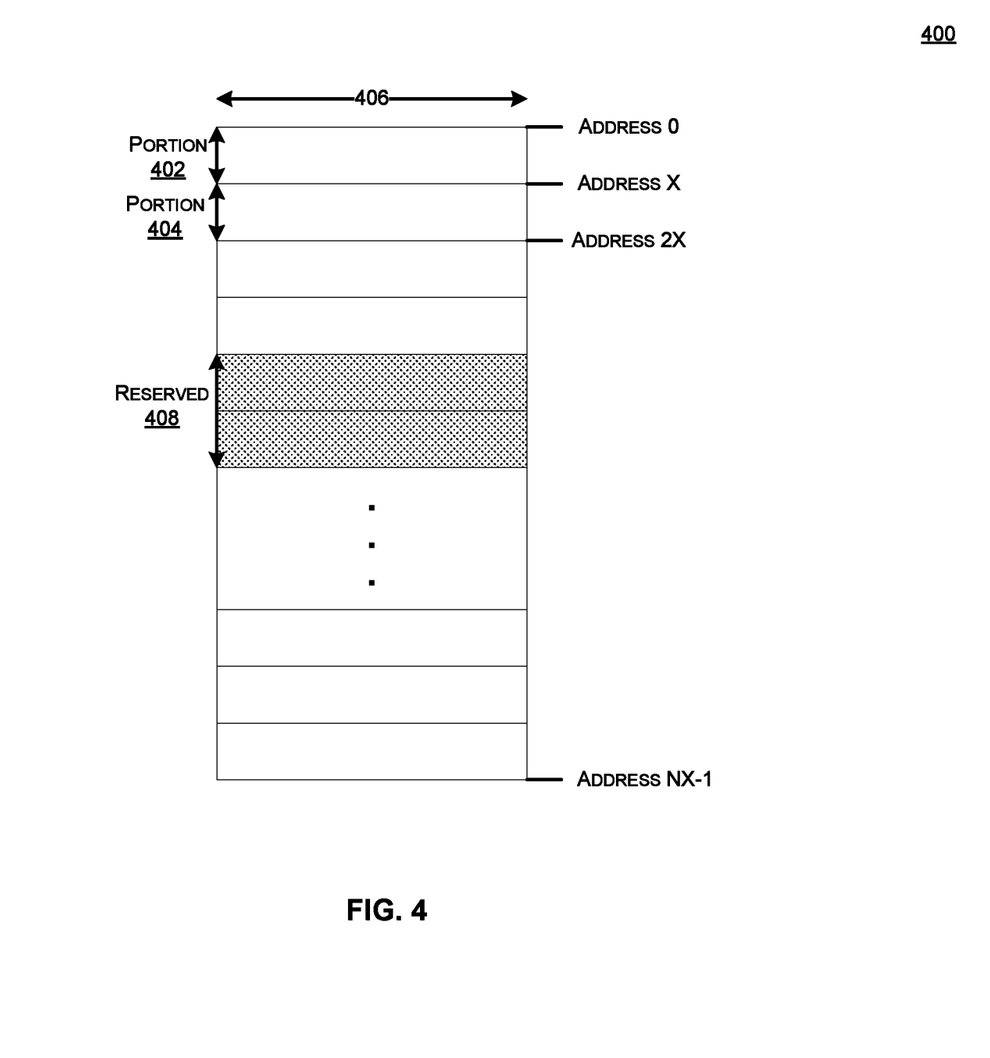
FIG. 4 illustrates a memory map for the memory, which can be used to describe certain embodiments.

FIG. 4 illustrates a memory map 400 for the memory 202, which can be used to describe certain embodiments.

In certain embodiments, a portion 402 of the memory 202 can be read by the network controller 114 to cause the memory controller 112 to scrub the data read from each location of the memory 202 corresponding to the portion 402. As an example, the memory 202 can be scrubbed one portion at a time, which can correspond to X number of addresses. Each read operation can read memory data at an address from the X addresses with a data width 406. The data width 406 may be supported by the memory bus 118 as discussed with reference to FIG. 1.

In certain examples, the memory patrol operation can start from a first address of the memory 202. For example, the network controller 114 can initiate a read operation to read the portion 402 of the memory 202 starting at an address 0. The memory patrol driver 110 may setup the DMA descriptors to initiate a DMA transfer for the network controller 114 to read the portion 402 from the memory device 104. For example, the DMA descriptors may include a source address that corresponds to the address 0 of the memory 202, a destination address that corresponds to an address of the transmit buffer 306, a transfer size as the size of the portion 402 to be scrubbed, and the direction of the transfer that corresponds to reading from the memory device 104. The DMA controller 302 may perform the DMA transfer based on the DMA descriptors to read the data corresponding to the portion 402 from the memory 202. The memory controller 112 may scrub the data as it accesses each location of the memory 202 from the address 0 to address X−1 to read the portion 402. The scrubbed data corresponding to the portion 402 can be received by the network controller 114 via the memory interface 316 and stored in the transmit buffer 306. The transmit MAC unit 310 can discard this scrubbed data instead of transmitting it to the PHY based on the memory patrol enable bit in the configuration register.

In certain implementations, instead of sending the scrubbed data to the transmit MAC unit 310, the scrubbed data can be looped back from the transmit buffer 306 to the receive buffer 308 as the ingress network packets. The receive buffer 308 can discard this scrubbed data based on the memory patrol enable bit. Note that any suitable method can be used to discard the scrubbed data read from the memory 202 instead of transmitting it over the network 120, without deviating from the scope of the disclosure.

After a certain time interval, the memory patrol driver 110 may setup the DMA descriptors again to initiate another DMA transfer to read a next portion 404 of the memory 202 from an address X to an address (2X−1). The DMA controller 302 may perform the second DMA transfer based on the DMA descriptors to read the data corresponding to the portion 404 from the memory 202. The memory controller 112 may scrub the data corresponding to the portion 404 and the network controller 114 can receive the scrubbed data and discard it (e.g., drop it) instead of transmitting it. Note that the embodiments are not limited to scrubbing the same portion size of the memory, and can support variables sizes of the portions for different read operations without deviating from the scope of the disclosure. For example, the portion 402 and the portion 404 can be same or different based on the DMA transfer size specified in the corresponding DMA descriptors.

Thus, the memory patrol operation can be performed to read a portion of the memory 202 successively by scheduling the successive DMA transfers at certain time intervals, until the whole memory space has been patrolled (e.g., address 0-address NX−1). Once the whole memory space has been patrolled, the memory patrol operation can continue starting with the address 0 again. The memory patrol operation can continue patrolling the whole memory space repeatedly, until a multi-bit error is identified, or the operation is interrupted for some other reason. The continuous patrolling of the memory 202 can allow detecting and correcting single-bit errors in a timely manner before they get accumulated into multi-bit errors.

In certain embodiments, a reserved portion 408 of the memory space 400 can also be patrolled as part of the memory patrol operation. For example, the reserved portion 408 may not be used by any application and may be reserved by the operating system executing on the processor 106 for future use or for security reasons. Generally, the unused or reserved portions are not scrubbed by the memory controller 112 since there are no read operations performed to the unused or reserved portions. However, certain embodiments can allow reading the whole memory space including the reserved portion 408 which can cause the memory controller 112 to scrub the reserved portion 408 as well, thus detecting and correcting the single-bit errors in the reserved portion 408.

Figure 5:
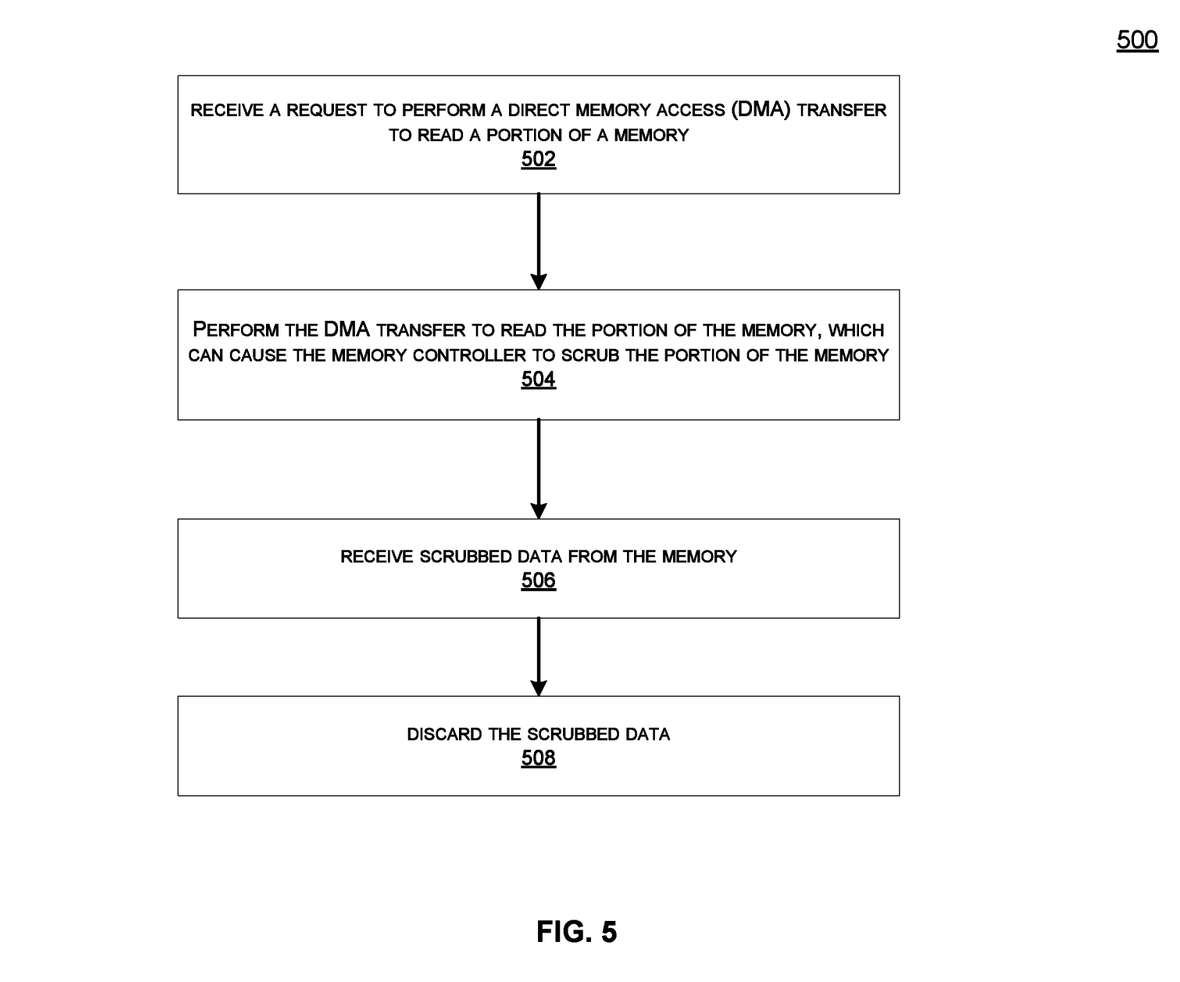
FIG. 5 illustrates a flow chart for a method to use a memory controller to perform the memory scrubbing, according to certain embodiments.

FIG. 5 illustrates a flow chart 500 for a method to enable a memory controller to perform memory scrubbing, according to certain embodiments. The method may be performed by the network controller 114 in FIG. 1 to enable the memory controller 112 to perform memory scrubbing on the memory device 104.

In step 502, the method may include receiving a request to perform a DMA transfer to read a portion of a memory. For example, the memory patrol driver 110 may initiate a DMA transfer to read the portion 402 of the memory 202 by configuring a DMA descriptor. The DMA descriptor may include a source address that corresponds to the memory address 0 corresponding to the portion 402, a destination address corresponding to an address in the transmit buffer 306, a transfer size that corresponds to a size of the portion 402, and a direction of the DMA transfer that corresponds to reading from the memory 202. The network controller 302 may receive the request from the processor 106 via the processor interface 314.

In step 504, the method may include performing the DMA transfer to read the portion of the memory, which can cause the memory controller to scrub the portion of the memory. The DMA controller 302 may perform the DMA transfer to read the portion 402 of the memory 202 starting at the address 0 as if the portion 402 of the memory is storing network packets. As discussed with reference to FIG. 2, the ECC detection and correction circuitry 208 can detect whether a single-bit error exists on the output data 220 corresponding to the portion 402. If a single-bit error is detected, the ECC detection and correction circuitry 208 can correct the error and write the corrected data 222 to the same location in the memory 202. The memory controller 112 can scrub the data for each of the locations corresponding to the portion 402 (e.g., address 0 to address X−1).

In step 506, the method may include receiving scrubbed data from the memory. The network controller 114 may receive the scrubbed data from the memory 104 using the memory interface 316 and store the scrubbed data in the transmit buffer 306.

In step 508, the method may include discarding the scrubbed data. The network controller 114 may discard the scrubbed data stored in the transmit buffer 306 instead of transmitting it on the network interface 120. For example, the transmit MAC unit 310 may drop the packets read from the memory device 104 based on the configuration register in the DMA registers 304. In certain implementations, instead of sending the scrubbed data to the transmit MAC unit 310, the scrubbed data can be looped back from the transmit buffer 306 to the receive buffer 308 as the ingress network packets. For example, the configuration register may be programmed to enable the memory patrol operation for each DMA transfer to be performed for memory scrubbing, which can cause the transmit MAC unit 310 to drop the data.

The steps 502-508 can be repeated to scrub the whole memory 202, one portion at a time, in a continuous manner based on initiating the DMA transfers at the time interval. For example, once all the portions of the memory 202 corresponding to the address 0 to an address NX−1 have been scrubbed, the memory patrol operation can start again from the address 0. The memory patrol operation can be performed until a multi-bit error is detected. In such a case, an interrupt may be sent by the memory controller 112 to the processor 106 using the normal communication protocol. In some cases, the memory patrol operation can be paused (or disabled) by the memory patrol driver 110 and can be started again.

The memory patrol operations described with reference to FIGS. 1-5 can be performed at a slower speed in the background so that the normal operation of the SoC 100 is not impacted. Continuous patrolling of the memory device 104 can allow the memory controller 112 to detect and correct the single-bit errors frequently and in a timely error so that the memory device 104 can be free of errors and multi-bit error can be avoided, thus protecting the memory data.

Figure 6:
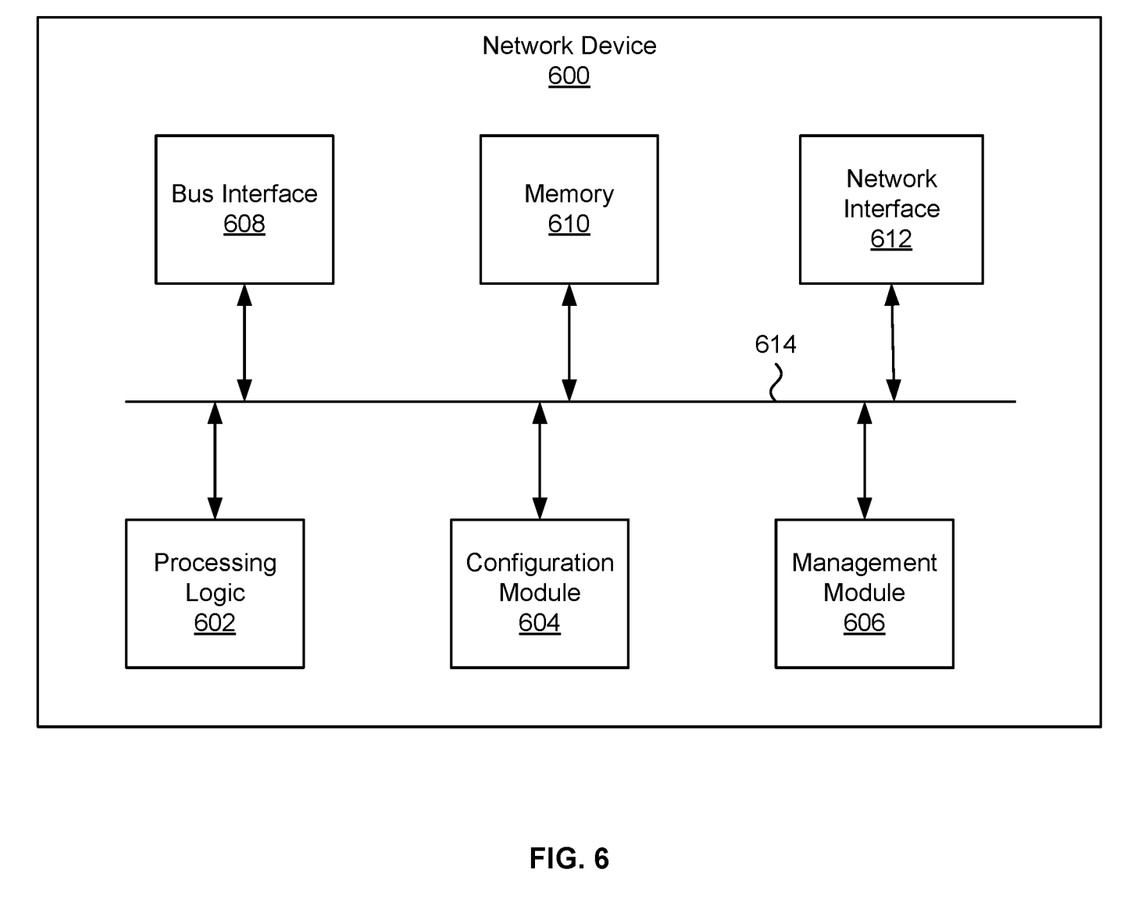
FIG. 6 illustrates an example of a network device, according to certain aspects of the disclosure.

FIG. 6 illustrates an example of a network device 600. Functionality and/or several components of the network device 600 may be used without limitation with other embodiments disclosed elsewhere in this disclosure, without limitations. In certain embodiments, the network device 600 may include functionality or components of the network controller device 300 which can be used to perform the memory patrol operation as described with reference to FIGS. 1-5. A network device 600 may facilitate processing of packets and/or forwarding of packets from the network device 600 to another device. As referred to herein, a "packet" or "network packet" may refer to a variable or fixed unit of data. In some instances, a packet may include a packet header and a packet payload. The packet header may include information associated with the packet, such as the source, destination, quality of service parameters, length, protocol, routing labels, error correction information, etc. In certain implementations, one packet header may indicate information associated with a series of packets, such as a burst transaction. In some implementations, the network device 600 may be the recipient and/or generator of packets. In some implementations, the network device 600 may modify the contents of the packet before forwarding the packet to another device. The network device 600 may be a peripheral device coupled to another computer device, a switch, a router or any other suitable device enabled for receiving and forwarding packets.

In one example, the network device 600 may include processing logic 602, a configuration module 604, a management module 606, a bus interface module 608, memory 610, and a network interface module 612. These modules may be hardware modules, software modules, or a combination of hardware and software. In certain instances, modules may be interchangeably used with components or controllers, without deviating from the scope of the disclosure. The network device 600 may include additional modules, which are not illustrated here. In some implementations, the network device 600 may include fewer modules. In some implementations, one or more of the modules may be combined into one module. One or more of the modules may be in communication with each other over a communication channel 614. The communication channel 614 may include one or more busses, meshes, matrices, fabrics, a combination of these communication channels, or some other suitable communication channel.

The processing logic 602 may include application specific integrated circuits (ASICs), field programmable gate arrays (FPGAs), systems-on-chip (SoCs), network processing units (NPUs), processors configured to execute instructions or any other circuitry configured to perform logical arithmetic and floating point operations. Examples of processors that may be included in the processing logic 602 may include processors developed by ARM®, MIPS®, AMID®, Qualcomm®, and the like. In certain implementations, processors may include multiple processing cores, wherein each processing core may be configured to execute instructions independently of the other processing cores. Furthermore, in certain implementations, each processor or processing core may implement multiple processing threads executing instructions on the same processor or processing core, while maintaining logical separation between the multiple processing threads. Such processing threads executing on the processor or processing core may be exposed to software as separate logical processors or processing cores. In some implementations, multiple processors, processing cores or processing threads executing on the same core may share certain resources, such as for example busses, level 1 (L1)

caches, and/or level 2 (L2) caches. The instructions executed by the processing logic 602 may be stored on a computer-readable storage medium, for example, in the form of a computer program. The computer-readable storage medium may be non-transitory. In some cases, the computer-readable medium may be part of the memory 610.

The memory 610 may include either volatile or non-volatile, or both volatile and non-volatile types of memory. The memory 610 may, for example, include random access memory (RAM), read only memory (ROM), Electrically Erasable Programmable Read-Only Memory (EEPROM), flash memory, and/or some other suitable storage media. In some cases, some or all of the memory 610 may be internal to the network device 600, while in other cases some or all of the memory may be external to the network device 600. The memory 610 may store an operating system comprising executable instructions that, when executed by the processing logic 602, provides the execution environment for executing instructions providing networking functionality for the network device 600. The memory may also store and maintain several data structures and routing tables for facilitating the functionality of the network device 600.

In some implementations, the configuration module 604 may include one or more configuration registers. Configuration registers may control the operations of the network device 600. In some implementations, one or more bits in the configuration register can represent certain capabilities of the network device 600. Configuration registers may be programmed by instructions executing in the processing logic 602, and/or by an external entity, such as a host device, an operating system executing on a host device, and/or a remote device. The configuration module 604 may further include hardware and/or software that control the operations of the network device 600.

In some implementations, the management module 606 may be configured to manage different components of the network device 600. In some cases, the management module 606 may configure one or more bits in one or more configuration registers at power up, to enable or disable certain capabilities of the network device 600. In certain implementations, the management module 606 may use processing resources from the processing logic 602. In other implementations, the management module 606 may have processing logic similar to the processing logic 602, but segmented away or implemented on a different power plane than the processing logic 602.

The bus interface module 608 may enable communication with external entities, such as a host device and/or other components in a computing system, over an external communication medium. The bus interface module 608 may include a physical interface for connecting to a cable, socket, port, or other connection to the external communication medium. The bus interface module 608 may further include hardware and/or software to manage incoming and outgoing transactions. The bus interface module 608 may implement a local bus protocol, such as Peripheral Component Interconnect (PCI) based protocols, Non-Volatile Memory Express (NVMe), Advanced Host Controller Interface (AHCI), Small Computer System Interface (SCSI), Serial Attached SCSI (SAS), Serial AT Attachment (SATA), Parallel ATA (PATA), some other standard bus protocol, or a proprietary bus protocol. The bus interface module 608 may include the physical layer for any of these bus protocols, including a connector, power management, and error handling, among other things. In some implementations, the network device 600 may include multiple bus interface modules for communicating with multiple external entities. These multiple bus interface modules may implement the same local bus protocol, different local bus protocols, or a combination of the same and different bus protocols.

The network interface module 612 may include hardware and/or software for communicating with a network. This network interface module 612 may, for example, include physical connectors or physical ports for wired connection to a network, and/or antennas for wireless communication to a network. The network interface module 612 may further include hardware and/or software configured to implement a network protocol stack. The network interface module 612 may communicate with the network using a network protocol, such as for example TCP/IP, Infiniband, RoCE, Institute of Electrical and Electronics Controllers (IEEE) 802.11 wireless protocols, User Datagram Protocol (UDP), Asynchronous Transfer Mode (ATM), token ring, frame relay, High Level Data Link Control (HDLC), Fiber Distributed Data Interface (FDDI), and/or Point-to-Point Protocol (PPP), among others. In some implementations, the network device 600 may include multiple network interface modules, each configured to communicate with a different network. For example, in these implementations, the network device 600 may include a network interface module for communicating with a wired Ethernet network, a wireless 802.11 network, a cellular network, an Infiniband network, etc.

The various components and modules of the network device 600, described above, may be implemented as discrete components, as a System on a Chip (SoC), as an ASIC, as an NPU, as an FPGA, or any combination thereof. In some embodiments, the SoC or other component may be communicatively coupled to another computing system to provide various services such as traffic monitoring, traffic shaping, computing, etc. In some embodiments of the technology, the SoC or other component may include multiple subsystems.

The modules described herein may be software modules, hardware modules or a suitable combination thereof. If the modules are software modules, the modules can be embodied on a non-transitory computer readable medium and processed by a processor in any of the computer systems described herein. It should be noted that the described processes and architectures can be performed either in real-time or in an asynchronous mode prior to any user interaction. The modules may be configured in the manner suggested in FIG. 6, and/or functions described herein can be provided by one or more modules that exist as separate modules and/or module functions described herein can be spread over multiple modules.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Various embodiments of this disclosure are described herein, including the best mode known to the inventors for carrying out the disclosure. Variations of those embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A system-on-chip (SoC) comprising:
   a processor configured to execute instructions stored in a non-transitory computer-readable medium, wherein the instructions, when executed, cause the processor to execute a memory patrol driver, the memory patrol driver configured to initiate direct memory access (DMA) transfers, at a time interval, to read successive portions of a memory;
   a memory controller configured to perform memory scrubbing on the memory; and
   a network controller configured to:
      perform the DMA transfers initiated by the memory patrol driver to read a corresponding portion of the memory via the memory controller, wherein reading the corresponding portion of the memory causes the memory controller to perform the memory scrubbing to correct one or more correctable errors in the memory;
      receive scrubbed data including one or more corrected errors from the memory for the DMA transfers; and
      discard the scrubbed data including the one or more corrected errors.

2. The SoC of claim 1, wherein performing the memory scrubbing by the memory controller on each portion of the memory includes:
   for each address of the memory corresponding to the portion:
      reading data from the memory at that address;
      determining whether a single-bit error-correcting code (ECC) error exists on the data;
      upon determining that the single-bit ECC error exists on the data, correcting the single-bit ECC error on the data; and
      writing the corrected data to the memory at that address.

3. The SoC of claim 2, wherein performing the memory scrubbing on each portion of the memory further includes:
   determining that an un-correctable error exists on the data; and
   sending a message to the memory patrol driver that the un-correctable error exists on the data.

4. The SoC of claim 1, wherein the memory patrol driver initiates the DMA transfers to read the successive portions of the memory by configuring a corresponding DMA descriptor at each time interval.

5. A network controller device comprising:
   a memory interface configured to communicate with a memory controller to read data from a memory;
   a processor interface configured to communicate with a processor, wherein the processor is configured to initiate a direct memory access (DMA) transfer to read a portion of the memory; and
   a DMA controller configured to perform the DMA transfer to read the portion of the memory, wherein reading the portion of the memory causes the memory controller to scrub the portion of the memory to correct one or more correctable errors,
   wherein scrubbed data including one or more corrected errors received from the memory is discarded by the network controller device.

6. The network controller device of claim 5, wherein the memory controller scrubs the portion of the memory by:
   for each address of the memory corresponding to the portion:
      reading data from the memory at that address;
      determining whether a single-bit error-correcting code (ECC) error exists on the data;
      upon determining that the single-bit ECC error exists on the data, correcting the single-bit ECC error on the data; and
      writing the corrected data to the memory at that address.

7. The network controller device of claim 5, wherein the DMA transfer is initiated by a memory patrol driver executing on the processor, and wherein the memory patrol driver is configured to initiate DMA transfers to read successive portions of the memory starting at a first memory address.

8. The network controller device of claim 7, wherein the memory patrol driver initiates the DMA transfers to read the successive portions of the memory by configuring a corresponding DMA descriptor for each DMA transfer.

9. The network controller device of claim 8, wherein the corresponding DMA descriptor for each DMA transfer is configured at a time interval.

10. The network controller device of claim 8, wherein each DMA descriptor includes a source address that corresponds to a memory address associated with a corresponding portion of the memory, a destination address that corresponds to a buffer address in the network controller device, a transfer size that corresponds to a size of the corresponding portion of the memory, and a direction of the DMA transfer that corresponds to reading from the memory.

11. The network controller device of claim 5, wherein reading the portion of the memory also causes the memory controller to determine whether an un-correctable error exists on the data.

12. The network controller device of claim 11, wherein the memory controller is configured to send a message to the processor upon determining that the un-correctable error exists on the data.

13. The network controller device of claim 5, wherein the network controller is configured to transmit or receive network packets using a media access control (MAC) unit.

14. The network controller device of claim 13, wherein the scrubbed data is not transmitted by the MAC unit as the network packets.

15. The network controller device of claim 5, wherein the portion of the memory includes a reserved portion which is normally unused.

16. A method comprising:
   receiving, by a network controller, a request to perform a direct memory access (DMA) transfer to read a portion of a memory, wherein the network controller is part of a system-on-chip (SoC), the SoC comprising a memory controller coupled to the memory, and a processor, wherein the processor is configured to execute a memory patrol driver, the memory patrol driver configured to initiate the DMA transfer;
   performing, by the network controller, the DMA transfer to read the portion of the memory, wherein reading the portion of the memory causes the memory controller to scrub the portion of the memory to correct one or more correctable errors;
   receiving, by the network controller, scrubbed data including one or more corrected errors from the memory; and
   discarding, by the network controller, the scrubbed data including the one or more corrected errors.

17. The method of claim 16, wherein the memory controller scrubs the portion of the memory by:
   for each address of the memory corresponding to the portion:
      reading data from the memory at that address;
      determining whether a single-bit error-correcting code (ECC) error exists on the data;
      upon determining that the single-bit ECC error exists on the data, correcting the single-bit ECC error on the data; and
      writing the corrected data to the memory at that address.

18. The method of claim 16, wherein the memory patrol driver initiates DMA transfers to read successive portions of the memory by configuring a corresponding DMA descriptor at a time interval.

19. The method of claim 16, wherein the portion of the memory includes a reserved portion which is normally unused.

20. The method of claim 16, wherein the network controller includes a media access control (MAC) unit to transmit or receive network packets, and the scrubbed data is not transmitted by the MAC unit as the network packets.

* * * * *